United States Patent [19]

Gheorghe

[11] Patent Number: 4,501,986
[45] Date of Patent: Feb. 26, 1985

[54] FERROMAGNETIC CORE DISK ARMATURE WITH BAR WINDINGS

[75] Inventor: Olaru Gheorghe, Bucharest, Romania

[73] Assignee: Institutul de Cercetari Pentru Industria Electro-Tehnica-Icpe, Bucharest, Romania

[21] Appl. No.: 68,496

[22] Filed: Aug. 21, 1979

[51] Int. Cl.³ .............................................. H02K 1/22
[52] U.S. Cl. ..................................... 310/268; 310/201
[58] Field of Search ...................... 310/268, 201, 211

[56] References Cited

U.S. PATENT DOCUMENTS

| | | | |
|---|---|---|---|
| 376,307 | 1/1888 | Jehl | 310/268 X |
| 3,101,425 | 8/1963 | Moressee et al. | 310/268 |
| 3,292,024 | 12/1966 | Kober | 310/268 X |
| 3,428,840 | 2/1969 | Kober | 310/268 X |
| 3,543,066 | 11/1970 | French | 310/268 X |

FOREIGN PATENT DOCUMENTS 1426280 12/1966 France ................................ 310/268

Primary Examiner—Mark O. Budd

[57] ABSTRACT

A ferromagnetic core disk armature has one armature winding in a single layer with one collector. The winding is formed by a plurality of interconnected first and second types of winding sections, each type being disposed on one different side of the core. The two types are identical except for a radially inwardly extending prolongation on one type which forms the one collector. The winding sections are interconnected only at the periphery of the core.

10 Claims, 5 Drawing Figures

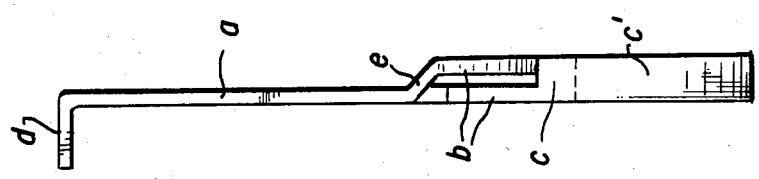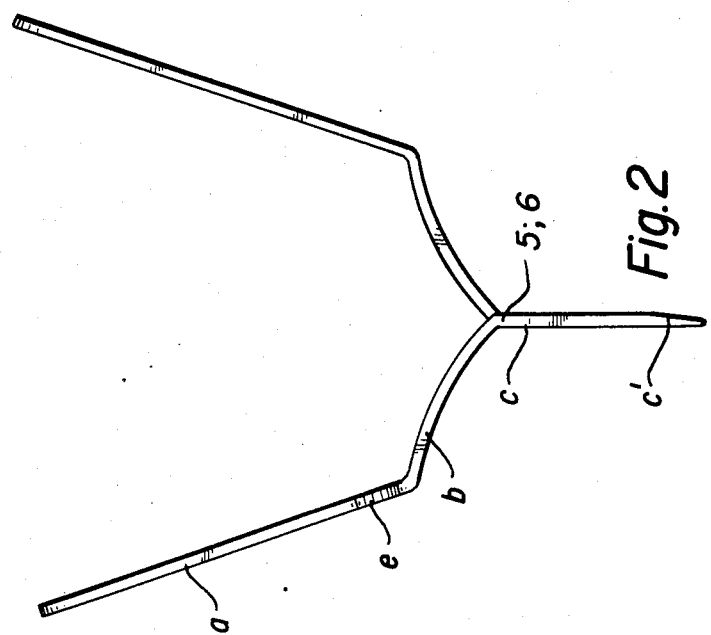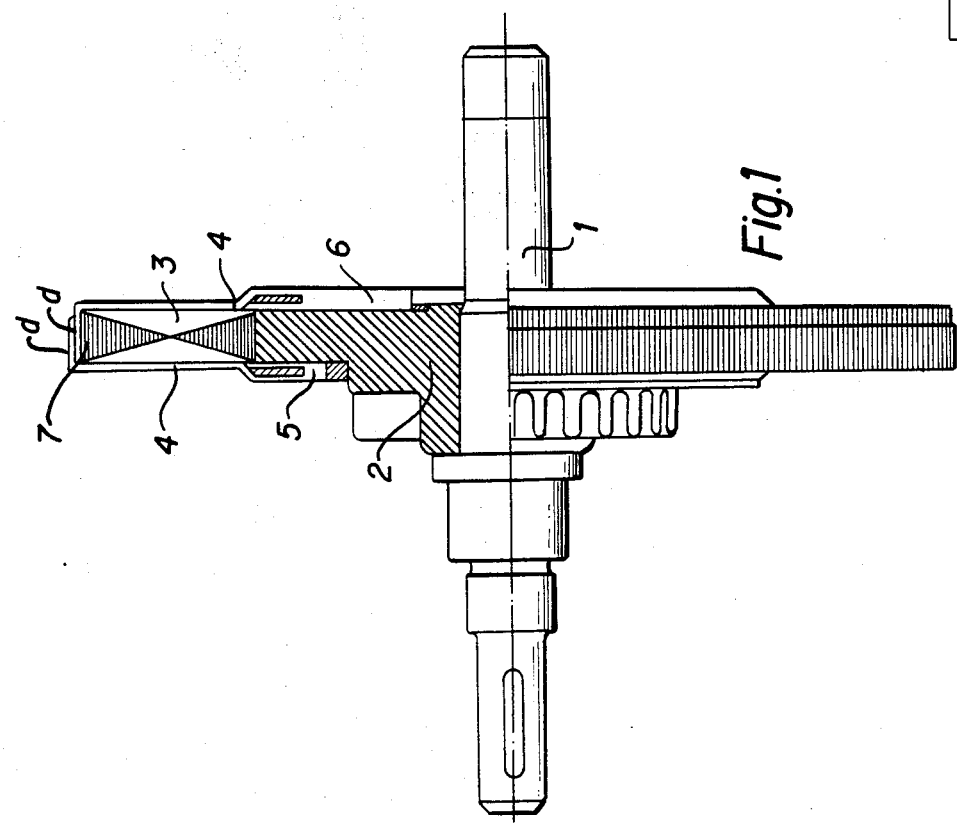

FERROMAGNETIC CORE DISK ARMATURE WITH BAR WINDINGS

BACKGROUND OF THE INVENTION

The present invention relates to a ferromagnetic core disk armature for axial air gap motors or the like.

Ferromagnetic core disk armatures or rotors are known where two separate windings are fixed. These rotors have the disadvantage of having two collectors which necessitate the existence of brushes on both sides thereof. This results in the disadvantage of requiring numerous connections.

Also known are ferromagnetic core disk armatures or rotors having only one winding formed from pressing copper circular leaves. These rotors have the disadvantage of having a relatively large number of connections disposed at very small distances apart.

Rotors of the known types are exemplified in Romanian Pat. Nos. 65,924 and 67,216.

SUMMARY OF THE INVENTION

The object of the present invention is to provide an armature which having one winding in a single layer with one collector and which eliminates the disadvantages of the prior art structures.

This and other objects of the present invention are achieved by the armature or rotor according to the present invention which includes a plurality of first and second winding sections, each of which is preferably formed by pressing and which are disposed on respective main surfaces in the sides of the armature core. The first and second winding sections differ from one another only by an inwardly radially extending prolongation that forms the single collector.

The first and second winding sections are configured so that they are interconnected with each other only at the peripheral surface of the core.

The ferromagnetic core disk armature according to the present invention is an improvement over the prior art in that it has the advantages of having a reduced number of connections, having a sturdy collector which is disposed on only one side of the rotor, thus increasing the efficiency of electric motors using same and having a lifetime comparable to that of classical rotors.

Numerous other features, objects and advantages of the invention will become apparent from the following specification when read in conjunction with the accompanying drawings wherein:

BRIEF DESCRIPTION OF THE DRAWINGS

FIG. 1 is a partially sectioned side view of the rotor according to the present invention;

FIG. 2 is a front view of one winding section;

FIG. 3 is a side view of the winding section of FIG. 2;

FIG. 4 is a side view of an unbent element from which the winding section of FIG. 2 is formed.

DETAILED DESCRIPTION OF THE INVENTION

Figure 5:
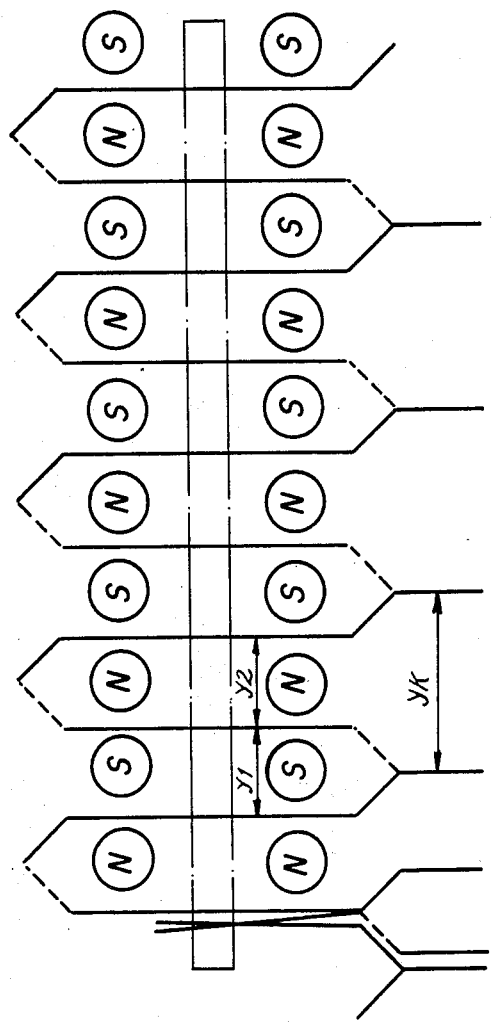
FIG. 5 is a schematic of a portion of the winding.

Referring now to FIG. 1, the armature or rotor comprises a shaft 1 on which a cooling flange casing 2 is fixedly mounted. A ferromagnetic core 3 which is preferably made from an electrotechnical steel band is disposed concentrically about the shaft 1 and casing 2 and fixedly mounted thereto.

The core 3 has insulating sheets 4, 4' disposed on the main surfaces of the sides thereof and an insulating band 7 is disposed on the peripheral surface thereof.

An armature winding on the core 3 is formed by winding sections 5, 6 which are shown in more detail in FIGS. 2-4. Each of the winding sections 6 are fixed on the one side of the core, at the right in FIG. 1, on the insulating sheet 4, while the winding sections 5 are fixed, at the leftmost side of the core 3 in FIG. 1, on the insulating sheet 4'.

The two types of winding sections 5, 6 are identical in construction except that winding section 5 terminates at the dotted line in FIGS. 2-4, while winding sections 6 have the extension or prolongation c' forming the collector for the armature.

The winding sections 5, 6 each include two radially extending arms a which lie on the insulating sheets 4, 4' on the core 3 and which have axially extending portions d at their outermost ends. The axially extending portions d are bent at a 90° angle with respect to arms a. Connecting the two arms a are two frontal interior parts b which are arcuate and converge. The parts b connect at radially extending member c which terminates at the dotted line for winding section 5 and which has a prolongation c' for winding section 6, as shown, which forms the collector.

Both types of winding sections are preferably composed of copper band which is shaped by pressing. After the pressing to form a fork-shaped member, which is preferably integral, as shown in FIG. 4, the final product shown in FIGS. 2 and 3 is formed by first varnish insulating the portions thereof corresponding to parts b, c and c' of the winding sections 5, 6. The fork-shaped member is then worked up to the final shape by conventional metal working techniques.

In order to realize the winding in one layer, one of the two arms a of each winding section is bent at e at the junction to part b in order to bring both arms a in the same plane as shown in FIG. 3.

The assembly of the winding sections 5, 6 on the core 3 is carried out by an indexing device. Each of the two types of winding sections 5, 6 are interconnected by connecting only the axially extending portions d of each type b winding section with portion d of the other type of winding section at the periphery of the core 3. The connecting of portions d is preferably carried out by soldering the two portions with a solder having a high melting point. After the interconnections are made, the indexing device is removed and the core 3 together with the winding and the casing 2 are introduced into a mold in which resin is poured in order to fix and insulate the winding sections 5, 6.

After pouring the resin, the subassembly is fixed on the shaft 1 and the surface of the collector which is obtained is processed on one side of the rotor.

FIG. 5 schematically represents a portion of winding which is realized, indicating the steps $y_1$, $y_2$ and $y_k$ of the winding and the succession of excitation poles.

It will be evident to those skilled in the art that numerous modifications of the specific embodiments described herein can be made without departing from the inventive concept and the invention is considered to include all of the features possessed by the apparatus and techniques disclosed herein.

What is claimed is:

1. An armature for axial air gap electric motors or the like, comprising: a disk-shaped ferromagnetic core; and means forming one armature winding in a single layer with one collector, said means comprising a plurality of first winding sections disposed on one side of the core and each having a radially inwardly extending prolongation forming the one collector, a plurality of second winding sections disposed on the other side of the core and each identical to the first winding sections without the prolongation and means interconnecting the first and second winding sections only at the periphery of the core.

2. The armature according to claim 1, wherein each winding section comprises two radially outwardly extending arms configured to run along one main surface of the core, each arm having an axially extending portion at the outward end thereof running along the peripheral surface of the core and an interior portion connecting the arms at the inward ends thereof and wherein the interconnecting means electrically connects the axially extending portions of each first winding section to an axially extending portion of the second winding sections to interconnect the winding sections in series.

3. The armature according to claim 2, wherein each interior connecting portion comprises two converging arcuate frontal elements and a radially extending element connecting the frontal elements and wherein the prolongation of each first winding section is a radial extension of the radially extending element.

4. The armature according to claim 3, wherein each winding section is formed from an integral fork-shaped member having a base portion corresponding to the radially extending element and two spaced apart tines corresponding to the arms and the frontal elements.

5. The armature according to claim 4, wherein one tine of each fork-shaped member is bent at the boundary of the associated arm and frontal element to dispose the arm in the same plane as the other resulting arm.

6. The armature according to claim 5, wherein the axially extending portions of the arms are bent at 90° with respect to the radially extending portions thereof.

7. The armature according to claim 2, wherein the means for interconnecting comprises a solder connection at the axially extending portions.

8. The armature according to claim 1, further comprising electrical insulation on the main surfaces and the peripheral surface of the core.

9. The armature according to claim 1, wherein the rotor winding is a wave winding that has the active part of the conductors arranged in one layer upon the ferromagnetic core.

10. The armature according to claim 1, wherein the winding is so designed that for the induction of electromotive forces the coaxial poles are orientated toward the winding with the same extermity N and N and S and S.

* * * * *